US008422730B2

(12) United States Patent
Kim et al.

(10) Patent No.: US 8,422,730 B2
(45) Date of Patent: Apr. 16, 2013

(54) SYSTEM FOR ANALYZING FORENSIC EVIDENCE USING IMAGE FILTER AND METHOD THEREOF

(75) Inventors: Youngsoo Kim, Daejeon (KR); Dowon Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1036 days.

(21) Appl. No.: 12/201,168

(22) Filed: Aug. 29, 2008

(65) Prior Publication Data

US 2009/0136140 A1 May 28, 2009

(30) Foreign Application Priority Data

Nov. 26, 2007 (KR) .................. 10-2007-0120757

(51) Int. Cl.
*G06K 9/00* (2006.01)
(52) U.S. Cl.
USPC .......................................................... 382/100
(58) Field of Classification Search .................. 382/100
See application file for complete search history.

(56) References Cited

U.S. PATENT DOCUMENTS

| | | | |
|---|---|---|---|
| 6,279,010 B1 * | 8/2001 | Anderson .............................. 1/1 |
| 6,792,545 B2 * | 9/2004 | McCreight et al. ............. 726/29 |
| 7,496,959 B2 * | 2/2009 | Adelstein et al. ................ 726/21 |
| 7,583,839 B2 * | 9/2009 | Shah et al. ..................... 382/168 |
| 7,603,344 B2 * | 10/2009 | Bousquet et al. ...................... 1/1 |
| 7,627,166 B2 * | 12/2009 | Shah .............................. 382/162 |
| 7,831,111 B2 * | 11/2010 | Shah et al. ..................... 382/305 |
| 7,941,386 B2 * | 5/2011 | Bousquet et al. ................ 706/45 |
| 2004/0260733 A1 * | 12/2004 | Adelstein et al. ............. 707/202 |
| 2005/0060643 A1 * | 3/2005 | Glass et al. ................. 715/501.1 |
| 2006/0101009 A1 * | 5/2006 | Weber et al. ...................... 707/3 |
| 2006/0257017 A1 * | 11/2006 | Luo ............................... 382/159 |
| 2007/0085710 A1 * | 4/2007 | Bousquet et al. ............... 341/50 |
| 2007/0085711 A1 * | 4/2007 | Bousquet et al. ............... 341/50 |
| 2007/0139231 A1 * | 6/2007 | Wallia et al. .................... 341/50 |

(Continued)

FOREIGN PATENT DOCUMENTS

| JP | 2006-167451 A | 6/2006 |
|---|---|---|
| KR | 1020070068162 A | 6/2007 |

OTHER PUBLICATIONS

C. Habis, and F. Krsmanovic, "Explicit Image Filter,", 2005, Stanford Univ., p. 1-10.*

(Continued)

*Primary Examiner* — Claire X Wang
*Assistant Examiner* — Gandhi Thirugnanam
(74) *Attorney, Agent, or Firm* — Ladas & Parry LLP

(57) ABSTRACT

The present invention provides a system for analyzing forensic digital evidence using an image filter and a method thereof. The system for analyzing forensic evidence using an image filter includes: a duplicator that creates a copy of digital evidence; a verifying unit that discriminates whether a copy and the original of the digital evidence are the same; an original storage that stores the original of the digital evidence; an evidence analyzer that classifies image files for the copy of the digital evidence stored in the original storage, on the basis of an image filtering model created by a learning model in accordance with predetermined categories, and then analyzes the evidence; and a reporting unit that creates a report about the result of evidence analysis. The image evidence analyzer includes an image file extractor, an image filtering model learning unit, an image filter, and a plurality of analyzers.

2 Claims, 4 Drawing Sheets

U.S. PATENT DOCUMENTS

| | | | |
|---|---|---|---|
| 2007/0147658 A1* | 6/2007 | Chiba et al. | 382/100 |
| 2007/0168455 A1* | 7/2007 | Sun | 709/217 |
| 2007/0192164 A1* | 8/2007 | Nong et al. | 705/10 |
| 2007/0226170 A1* | 9/2007 | Sun | 707/1 |
| 2008/0107311 A1* | 5/2008 | Huang et al. | 382/118 |
| 2009/0136140 A1* | 5/2009 | Kim et al. | 382/209 |
| 2009/0257671 A1* | 10/2009 | Fridrich et al. | 382/260 |
| 2009/0274364 A1* | 11/2009 | Shakya et al. | 382/165 |
| 2010/0005073 A1* | 1/2010 | Bousquet et al. | 707/3 |
| 2011/0138172 A1* | 6/2011 | McCreight et al. | 713/155 |
| 2011/0191533 A1* | 8/2011 | Coulter | 711/112 |
| 2011/0295886 A1* | 12/2011 | Bousquet et al. | 707/769 |

OTHER PUBLICATIONS

S. Steen and J. Hassell, "Computer Forensics 101", Oct. 2004, http://www.expertlaw.com/library/forensic_evidence/computer_forensics_.html, p. 1-12.*

S. Wang, "Measures of retaining digital evidence to prosecute computer-based cyber-crimes", Computer Standards & Interfaces May 29, 2006, p. 216-223.*

Author Unknown, "Forensic Procedures", Jun. 2004, http://www.iacis.com/forensic_examination_procedures.htm, p. 1-4.*

J. Craiger, "Computer Forensics Procedures and Methods", Nov. 28, 2008, Handbook of Information Security. John Wiley & Sons, p. 1-65.*

M. Saudi, "An Overview of Disk Imaging Tool in Computer Forensics", 2001, Sans Institute Reading Room, p. 1-11.*

US Department of Justice, "Forensic Examination of Digital Evidence: A Guide for Law Enforcement", Apr. 2004, National Institue of Justice, p. 1-91.*

Maeng-Jin Kang, et al; "Efficiency Improvement about Digital Evidence Investigation in Korea", Police Administration College, Nambu University, Jan. 31, 2007, Korea, pp. 180-190.

I.R. Jeong, et al; "Technologies and Trends of Digital Forensics", Electronic and Communication Trend Analysis, Electronics and Telecommunications Research Institute, Feb. 2007 (exact date not given) 14 pages.

* cited by examiner

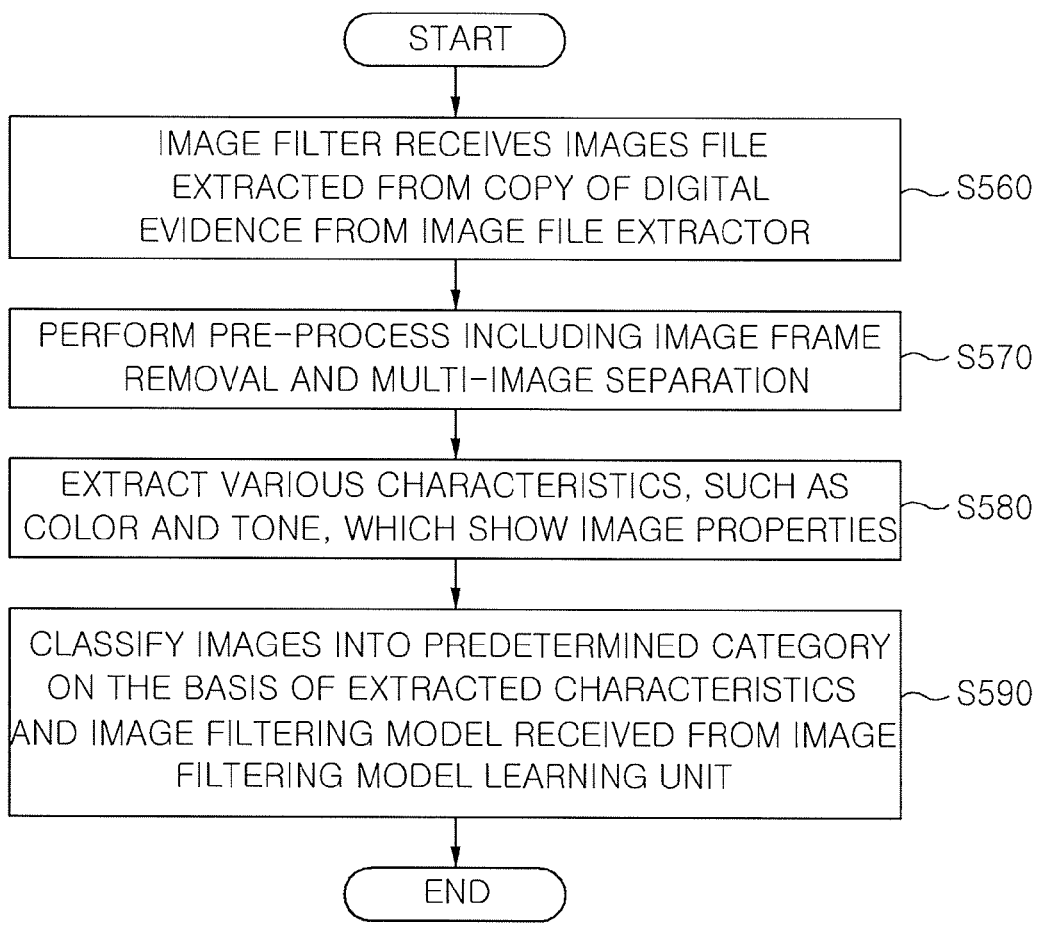

SYSTEM FOR ANALYZING FORENSIC EVIDENCE USING IMAGE FILTER AND METHOD THEREOF

BACKGROUND OF THE INVENTION

1. Field of the Invention

The present invention relates to a system for analyzing forensic evidence using an image filter and a method thereof, in particular a system for analyzing forensic evidence using an image filter and a method thereof, which allows an examiner to analyze digital evidence using an image filter to which a learning model is applied, without fully examining all of the massive amount of images, when the examiner analyzes the digital evidence for a variety of images stored in a hard disk of a suspect's PC.

This invention was supported by the IT R&D program of MIC/IITA [2007-S-019-01, Development of Digital Forensic System for Information Transparency].

2. Description of the Related Art

Recently, in addition to computer crimes, even in general crimes, important evidence or clues are increasingly stored in a variety of electronic media, such as computer. The digital data is easily duplicated and it is difficult to discriminate the original from a copy. Further, the digital data can be easily falsified, changed, or deleted from the original data. Therefore, a criminal investigation cannot be conducted with only basic data as evidence. As intellectual computer crimes increase, high level of digital forensic technologies are required for tracing and analyzing evidence; as a result, the digital forensic technologies are being continuously developed to satisfy the above requirements.

The digital forensic technology is divided into a digital evidence collection technique, a digital evidence analysis technique including a digital evidence recovery technique and a digital evidence documentation technique. These techniques examine and analyze digital devices, such as computer or mobile phone, to find out potential evidence and include transmission of electronic data, discrimination of stored information, search, documentation, and preservation.

(1) Standardization of Digital Forensic Process

Standardization of digital forensic process is being increasingly developed to restore data that is damaged or deleted by a cyber criminal in a digital device, such as a computer or a mobile phone, and secure reliability of digital evidence so as to be accepted as admissible evidence.

(2) Imaging of Storage Media

It is very important to produce bit stream images that are physically and logically identical to the originals that store digital evidence that can be easily damaged or deleted. Further, the imaging of storage media that produces bit stream images regardless of the types of the storage media, such as hard disk, CD, and USB, and the operating system for the media is very important.

(3) Verification of Digital Evidence

Verification of digital evidence is used to prove that collected data is not falsified or damaged, using hash or error detection code so as to accept the data as admissible evidence.

(4) Collection of Live Data

Collection of live data is used to discriminate volatile data among live data in an active system and collect data in the order of data having the most volatility. For some live data, because it is impossible to duplicate files using common methods, collecting live data requires a technique that directly reads out the sectors of the hard disk to collect data and a technique that does not change an access time, changing time, and creating time of files. In particular, because information, such as registry and cash information, routing information, process information, and password information, may be stored in a memory, memory dump should be performed to acquire the data.

(5) Search and Gain of Password

Search and gain of password is used to search and gain passwords for MS Office, compressed programs, or encrypted file systems.

The search and gain of password needs to discriminate whether documents are encrypted and analyze the password structure of the documents to search the password of MS Office. Further, it needs to analyze the encrypting system and process used by compression programs to discriminate whether compressed files, such as AlZip or WinZip, are encrypted, or search the passwords. Further, in order to find out the password of an encrypted file system that is applied to NTFS, the encrypted file system needs to be analyzed. Furthermore, a technique of detecting and analyzing statistical profiles of images is being consistently researched to decrypt a steganography that hides files by changing empty spaces or some bits in the files.

(6) Visualization of Information

Visualization of information is used to represent the collected information to increase the efficiency of the forensic analysis. The visualization of information is used to visually display information using pictures, tables, and graphs such that a forensic examiner can easily recognize massive data, time-sequentially analyze the data, and filter and normalize large amount of records in the storage media.

(7) Forensic Data Mining

Forensic data mining is a useful forensic technique for huge computer systems that efficiently investigate and control data by finding out the correlation between data through deep analysis of the data.

Data mining is used for inspecting data, such as registry information or configuration information concerning main applications, such as web browser, messenger, and e-mail, installed in an objective system, and extracting evidence relating to the case from the acquired information. Forensic data mining allows a user to examine whether applications that may be used for a crime are installed and used.

Further, forensic data mining may include an investigation profiling technique that removes data that is not related to criminal cases and reduces the range of analysis on the basis of the researches for individual behavior patterns and a database for each case established by integrating and classifying factors that affect the cases.

(8) Mobile Forensic Technique

Mobile forensic technique is needed to collect, verify, analyze, and restore digital data in mobile devices such as mobile phones or PDAs that are commonly used.

The collecting technique includes collecting digital evidence from mobile devices, collecting data of users and hardware information of the terminal stored in the main memories of CDMA mobile phones, and collecting important information of the users, such as IMSI, ICCID, ADN, LND, SMS message, and LOCI, from the USIM card.

The analyzing technique includes verifying the collected data, that is, proving that the data is not falsified or damaged, analyzing and restoring digital evidence from mobile phones, analyzing the evidence from the information collected from CDMA/WCDMA terminals, and restoring damaged or deleted data of the flash memory in mobile phones.

(9) High-Speed Search of Massive Data Used Only for Forensics

With the increase of the capacity of hard disks and evidence to be inspected, high-speed search of massive data used only for forensics that searches desired information from a large amount of digital information within a short time has been researched.

High-speed search of massive data used only for forensics includes a Hashed Search that quickly analyzes data by determining whether the hash values of files correspond to a set of reference data and a technique that improves the search speed by creating index for all of the files by virtually mounting a file system from acquired image files, and then creating meta data information.

However, high-speed search of massive data is limited to search specific texts, but there are many images (pictures or photographs), other than texts, in personal computers used by criminals. For example, if pornographic images of children are stored in a computer, it is a grave crime. Therefore, it is very important to search the images, in addition to texts. Further, the analysis of images may be very important evidence data that determines the suspect's tendency or matter of interest. When a large amount of image files are stored in a personal computer, an urgent crime investigation ineffectively inspects all of the files; therefore, it is strongly required to improve the analysis technique.

SUMMARY OF THE INVENTION

The invention has been finalized in view of the drawbacks. An object of the invention is to provide a system for analyzing digital forensic evidence and a method thereof, which allows a forensic examiner to more efficiently analyze all of various image files on the hard disk of the suspect's PC within a short time without examining the image files one by one. Further, all of the image files in the hard disk are classified using an image filter to which a learning model previously provided with image samples is applied, in accordance with predetermined categories to accurately analyze evidence, which reduces the time for evidence analysis.

A system for digital forensic evidence analysis using an image filter according to an aspect of the invention, includes: a duplicator that creates a copy of digital evidence; a verifying unit that verifies whether the copy created by the duplicator is identical to the original of the digital evidence; an original storage that stores the original of the digital evidence on the basis of the result determined by the verifying unit; an evidence analyzer that classifies image files for the copy of the digital evidence stored in the original storage into predetermined categories, using the image filter including an image filtering model created by a learning model, and then analyzes the evidence; and a reporting unit that creates a report about the evidence analysis result obtained by the evidence analyzer.

The digital evidence stored in the original storage is image files collected from the hard disk of a computer or a memory of a digital device.

The evidence analyzer analyzes not only existing data and image files on the hard disk, but images restored from deleted and lost data and performs registry analysis, e-mail analysis, web history analysis, password analysis, and related keyword search analysis.

The evidence analyzer includes: an image evidence analyzer that analyzes image evidence included in the copy of the digital evidence; and one or more another analyzers that perform analysis for all evidence, such as the registry analysis, the web history analysis, the e-mail analysis, the web history analysis, the password analysis, and the related keyword search analysis, except for the image analysis.

The image evidence analyzer includes: an image file extractor that extracts all of the images included in the copy of the digital evidence; an image filtering model learning unit that receives learning sample images classified into predetermined categories, performs a pre-process, such as removing image frames or separating multi-images, and creates an image filtering model on the basis of characteristics, such as color and tone, which represent image properties extracted from the pre-processed learning sample images and a learning algorithm; and an image filter that receives image files extracted by the image file extractor, filters the image files into predetermined categories using the image filtering model created by the image filtering model learning unit, and then outputs the analysis result of the image classified into the predetermined categories.

A method of digital forensic evidence analysis using an image filter according to an aspect of the invention, includes: (a) acquiring digital evidence from the suspect's PC and creating a copy of the acquired digital evidence by using a duplicator; (b) verifying whether the copy of the digital evidence is identical to the original by using a verifying unit, and storing the original of the digital evidence into a safe original storage; (c) analyzing the evidence using the copy of the digital evidence verified by an evidence analyzer; and (d) creating an evidence analysis report by using a reporting unit.

The analyzing of the evidence (c) includes: (c1) analyzing image evidence included in the copy of the digital evidence by activating an image evidence analyzer; and (c2) analyzing all evidence, except for image analysis, such as web history analysis and e-mail analysis, by activating other analyzers.

The analyzing of image evidence included in the copy of the digital evidence (c1) includes: (c11) extracting all of the images included in the copy of the digital evidence by using an image file extractor; (c12) receiving learning sample images, performing a pre-process, such as removing image frames and separating multi-images, and then creating an image filtering model on the basis of characteristics, such as color and tone, which represent image properties extracted from the pre-processed learning sample images and a learning algorithm, by using an image filtering model learning unit; and (c13) receiving the image files extracted by the image file extractor and providing the analysis result of the images classified into predetermined categories using the image filtering model created by the image filtering model learning unit, by using an image filter.

The analyzing of the evidence (c) includes analyzing not only present data and image files existing in the hard disk, but images restored from deleted or lost data.

As described above, according to the aspects of the invention, it is possible to simplify the analyzing process for an examiner, instead of individually examining all of image files stored on the hard disk of the suspect's PC and efficiently perform forensic analysis of the image files in the hard disk the suspect's PC by classifying the image files using an image filter to which a learning model previously provided with image samples is applied in accordance with predetermined categories to analyze the evidence.

Further, according to the aspects of the invention, since the image files can be automatically classified in the hard disk on the basis of the predetermined categories, using a technique of analyzing image evidence that uses an image filter to which a learning model is applied, a forensic examiner can more quickly analyze the image files, which reduce the time for analyzing evidence.

Further, a forensic examiner can determine the categories for classifying the image files at his discretion and a learning model can be previously created by inputting a huge amount of image samples on the predetermined categories. Therefore, when the image filter is actually applied, the classification accuracy can be improved.

Further, the aspects of the invention can be efficiently used during the learning process that creates an image learning model, one of important factors for image filtering, because the learning process can be previously performed using resources, independent of evidence analysis.

BRIEF DESCRIPTION OF THE DRAWINGS

FIG. 5 is a flow chart illustrating the operation of an image filter.

DESCRIPTION OF THE PREFERRED EMBODIMENTS

Hereinafter, exemplary embodiments of the invention will be described in detail with reference to the accompanying drawings.

Figure 1:
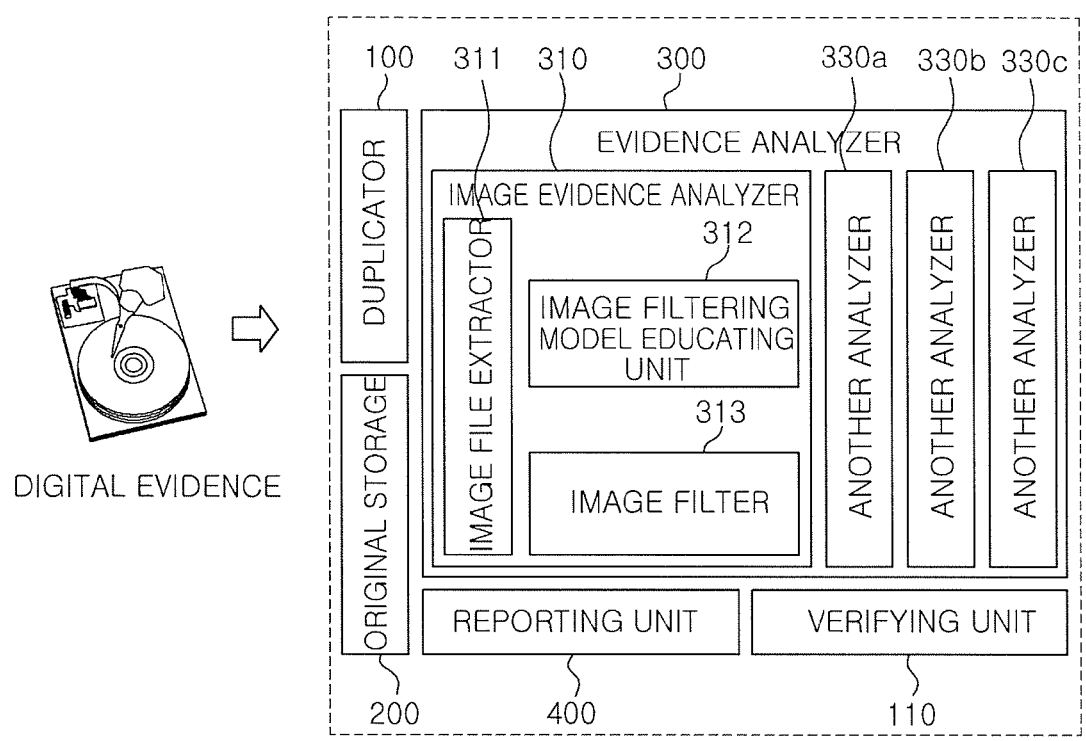
FIG. 1 is a diagram illustrating the configuration of a system for analyzing digital forensic evidence using an image filter according to an embodiment of the invention.

FIG. 1 is a diagram illustrating the configuration of a system for analyzing digital forensic evidence using an image filter according to an embodiment of the invention.

A system for analyzing digital forensic evidence using an image filter includes a duplicator 100 that creates a copy of digital evidence, a verifying unit 110 that verifies whether the copy of the digital evidence is identical to the original, an original storage 200 that stores the original of the digital evidence, an evidence analyzer 300 that classifies image files of the copy of the digital evidence stored in the hard disk in accordance with the predetermined categories, on the basis of an image filtering model created by a learning model, and then analyzes the evidence, and a reporting unit 400 that creates a report of the analyzed evidence obtained after the evidence analysis.

The digital evidence may be the hard disk of a computer, the memory of a mobile phone, the memory of a digital device, or a USB memory.

The evidence analyzer 300 includes an image evidence analyzer 310 that analyzes an image evidence of the copy of the digital evidence and a plurality of analyzers 330a, 330b, 330c that analyze all of the evidence except for the images, including registry analysis, web history analysis, e-mail analysis, password analysis, related keyword search analysis, etc.

In detail, the evidence analyzer 310 includes an image file extractor 311, an image filtering model learning unit 312, and an image filter 313.

The image file extractor 311 extracts all the images included in the copy of the digital evidence and provides them to the image filter 313.

The image filtering model learning unit 312 receives learning sample images collected in accordance with predetermined categories by a manager and then performs a pre-process including image frame removal and multi-image separation; thereafter, extracts a variety of characteristics that represent the image properties, such as color and tone, creates an image filtering model on the basis of the extracted characteristics and a learning algorithm, and then transmits the created image filtering model to the image filter 313.

The image filter 313 receives the image files extracted from the copy of the digital evidence from the image file extractor 311, performs a pre-process including image frame removal and multi-image separation, extracts a variety of characteristics that represent the image properties, such as color and tone. Thereafter, the image filter 313 classifies (filters) images in accordance with the predetermined categories on the basis of the extracted characteristics and the image filtering model transmitted from the image filtering model learning unit 312 and then outputs the analysis result of the images classified into predetermined categories.

The analyzer 330a provides all evidence analysis functions, except for the image analysis, and may be called a registry analyzer, a password analyzer, a keyword search analyzer, a web history analyzer, or an e-mail analyzer.

Figure 2:
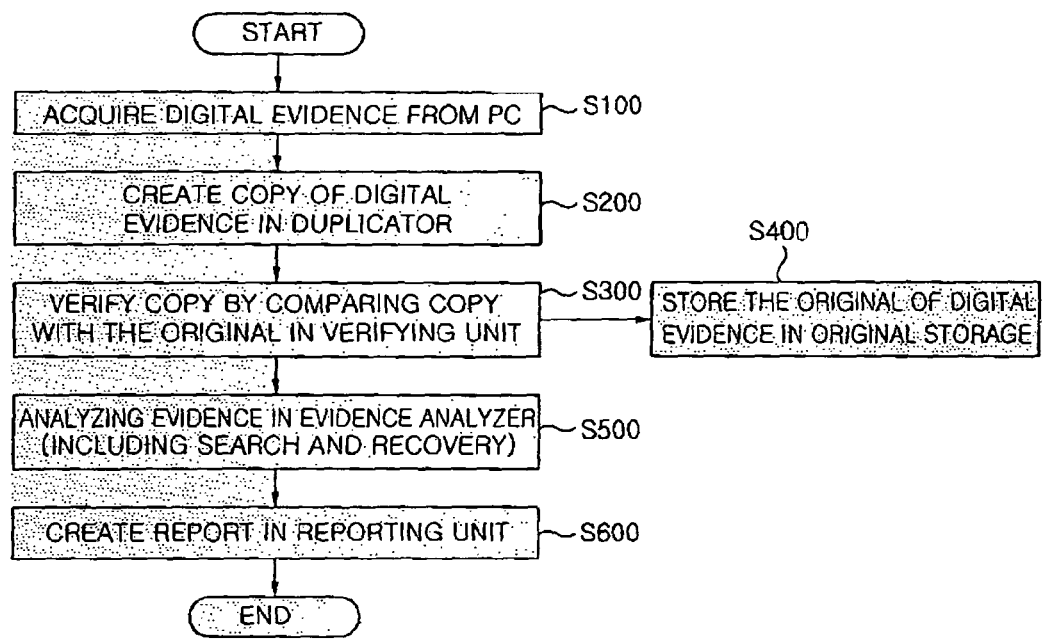
FIG. 2 is a flow chart illustrating a common process of collecting and analyzing digital evidence.

FIG. 2 is a flow chart illustrating a common process of collecting and analyzing digital evidence.

After digital evidence (usually a hard disk) is acquired from the suspect's PC (S100), the duplicator 100 starts to duplicate the acquired digital evidence (S200).

The verifying unit 110 verifies whether the copy of the digital evidence is identical to the original by comparing them and then stores the original of the digital evidence into the original storage 200 (S400).

When the original digital evidence is physically inspected, the original digital evidence may be damaged or deformed, therefore, the copy of the digital evidence is inspected instead of the original for the digital evidence analysis.

The evidence analyzer 300 analyzes the evidence from the copy of the digital evidence that is verified (S500).

Not only the existing data, but the deleted and lost data are included in the object of evidence analysis. The evidence analyzer 300 restores some of the deleted and lost data and uses them to analyze the evidence. In addition to restoring, the evidence analysis includes all parts of analysis for proving the fact of crime, including registry analysis, e-mail analysis, web history analysis, password analysis, and related keyword search, etc. The evidence analyzer 300 uses the image files stored in the hard disk, such as pictures or photographs to analyze the evidence. The restored or existing images may be important information to find out the fact of crime or the criminal's tendency.

The reporting unit 400 creates a report of all of the evidence that has been analyzed (S600) and then the entire process is finished.

Obscene images, such as child pornography, are the main objective images for analysis by an examiner, but various images may be considered as criminal evidence, depending on the details of the crimes.

The system for analyzing evidence according to an embodiment of the invention simplifies the process of analyzing individually a lot of digital images on the hard disk of the suspect's PC and analyzes image evidence using the image filter 313 to which the learning model is applied.

Because all of the image files on the hard disk are automatically classified into several categories using the image filter 313, the forensic examiner can more efficiently analyze the image files. The categories of the image files may be set by a manager (forensic examiner), at his discretion. Further, since a huge amount of image samples are previously input and learned in accordance with the categories, it may be possible to increase accuracy when applying the image filter.

Figure 3:
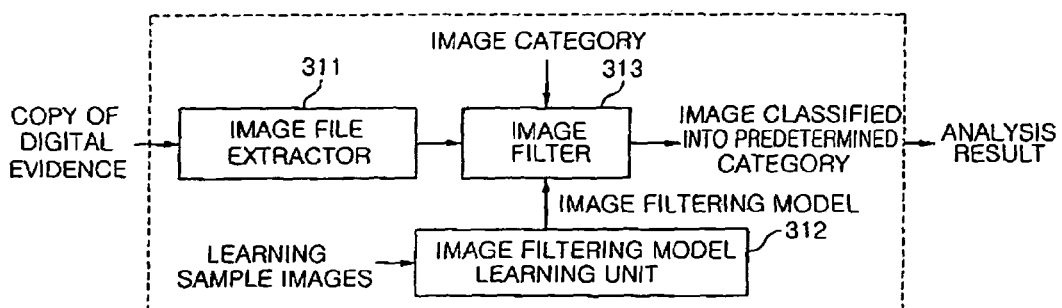
FIG. 3 is a flow chart illustrating a process of analyzing an image file among digital evidence according to an embodiment of the invention.

FIG. 3 is a flow chart illustrating the process of analyzing evidence for image files according to an embodiment of the invention.

First, as a pre-process, the manager or the examiner collects learning sample images in accordance with the predetermined image categories.

The image filtering model learning unit 312 receives the collected learning sample images, generates an image filtering model, and then transmits the image filtering model to the image filter 313. The learning process may be independently performed from filtering, such that it may be possible to improve the accuracy by learning more samples using resources in advance.

In this process, after images included in the copy of the digital evidence extracted from the image file extractor 311 are inputted to the image filter 313, the image filter 313 classifies the images into categories that are predetermined on the basis of the characteristics extracted by the pre-process, such as image frame removal and multi-image separation and the image filtering model received from the image filtering model learning unit 312.

Figure 4:
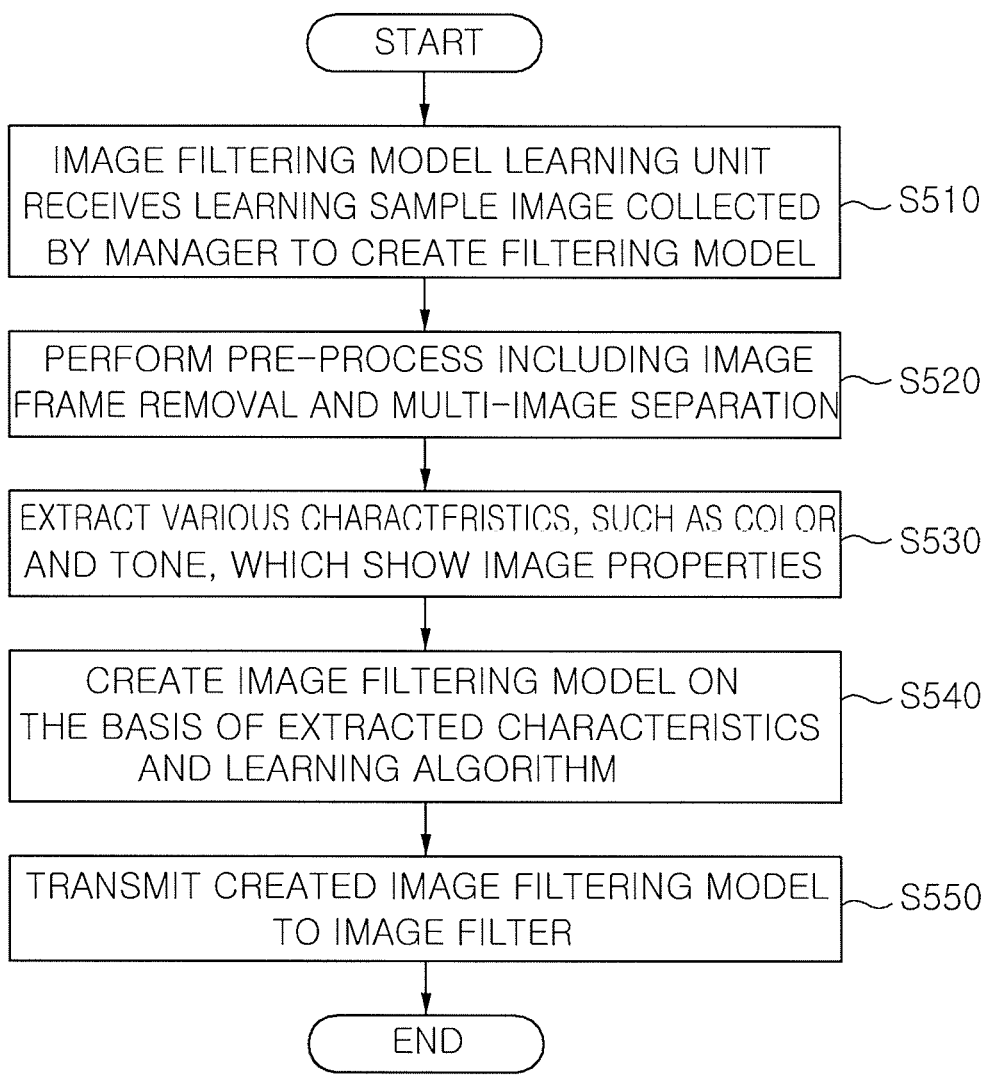
FIG. 4 is a flow chart illustrating the operation of an image filtering model learning unit.

FIG. 4 is a flow chart illustrating the operation of the image filtering model learning unit.

The image filtering model learning unit 312 receives the learning sample images collected by the manager to create a filtering model (S510) and then performs the pre-process, such as removing a present image frame or separating a multi-image from a huge amount of images (S520).

After the pre-process, the image filtering model learning unit 312 extracts various characteristics, such as color and tone, which represent the image properties (S530) and creates an image filtering model using the extracted characteristics and a learning algorithm (S540). The image filtering model learning unit 312 transmits the image filtering model created as described above to the image filter 313 (S550).

Because a huge amount of image samples are inputted and learned in advance in the image filtering model learning unit 312 according to the categories determined by the manager or the examiner, it may be possible to increase accuracy in classification when the system for analyzing evidence is applied to the image filter.

FIG. 5 is a flow chart illustrating the operation of the image filter.

The image filter 313 receives the image files extracted from the copy of digital evidence from the image file extractor 311 (S560) and performs the pre-process, such as removing an image frame and separating a multi-image, similar to the learning (S570).

After the pre-process, the image filter 313 extracts various characteristics, such as color or tone, which indicate image properties (S580), classifies (filters) images into predetermined categories on the basis of the extracted characteristics and the image filtering model transmitted from the image filtering model learning unit 312, and then outputs the result of analysis of the classified images (S590).

The image categories may be determined in advance for each case by the manager or the examiner at his discretion.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for analyzing digital forensic evidence using an image filter, comprising:
   a duplicator that creates a copy of digital evidence;
   a verifying unit that verifies whether the copy created by the duplicator is identical to the original of the digital evidence;
   an evidence analyzer that classifies image files of the copy of the digital evidence into predetermined categories, using the image filter including an image filtering model created by a learning model, and then analyzes the evidence; and
   a reporting unit that creates a report about the evidence analysis result obtained by the evidence analyzer,
   wherein the evidence analyzer analyzes not only existing data and image files on a hard disk, but also images restored from deleted and lost data and performs registry analysis, e-mail analysis, web history analysis, password analysis, and related keyword search analysis
   wherein the learning model improves an accuracy of the classifying by learning more samples using resources in advance,
   wherein the evidence analyzer includes:
      an image evidence analyzer that analyzes image evidence included in the copy of the digital evidence,
      an image file extractor that extracts all of the images included in the copy of the digital evidence;
      an image filtering model learning unit that receives learning sample images classified into predetermined categories, performs a pre-process, including removing image frames or separating multi-images, and creates an image filtering model on the basis of characteristics, including color and tone, which represent image properties extracted from the pre-processed learning sample images and a learning algorithm, and
      an image filter that receives image files extracted by the image file extractor, filters the image files into predetermined categories using the image filtering model created by the image filtering model learning unit, and then outputs the analysis result of the image classified into the predetermined categories.

2. The system of claim 1 wherein the copy of the digital evidence is image files collected from the hard disk of a computer or a memory of a digital device.

* * * * *